(12) United States Patent
Probst et al.

(10) Patent No.: US 10,807,697 B2
(45) Date of Patent: Oct. 20, 2020

(54) ROTARY WING AIRCRAFT WITH AN INTERFACE FRAME JOINING THE FUSELAGE TAIL BOOM AND THE TAIL CONE

(71) Applicant: AIRBUS HELICOPTERS DEUTSCHLAND GMBH, Donauworth (DE)

(72) Inventors: Stefan Probst, Schoenau (DE); Philipp Walch, Rain am Lech (DE); Marc Nothen, Rain am Lech (DE); Christian Buxel, Gersthofen (DE); Romed Schweizer, Waakirchen (DE); Thomas Wuerfl, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 969 days.

(21) Appl. No.: 15/416,067

(22) Filed: Jan. 26, 2017

(65) Prior Publication Data
US 2017/0327200 A1    Nov. 16, 2017

(30) Foreign Application Priority Data
Jan. 29, 2016 (EP) ..................... 16400002

(51) Int. Cl.
*B64C 1/26* (2006.01)
*B64C 1/06* (2006.01)
(Continued)

(52) U.S. Cl.
CPC ............. *B64C 1/26* (2013.01); *B64C 1/069* (2013.01); *B64C 27/04* (2013.01); *B64C 2001/0072* (2013.01); *Y02T 50/43* (2013.01)

(58) Field of Classification Search
CPC .... B64C 1/06; B64C 1/10; B64C 1/26; B64C 1/068; B64C 1/069; F42B 10/52; F42B 19/005
See application file for complete search history.

(56) References Cited

U.S. PATENT DOCUMENTS

| 4,244,661 A | 1/1981 | Dervy |
| 5,676,335 A | 10/1997 | Murgia, Jr. et al. |
| (Continued) | | |

FOREIGN PATENT DOCUMENTS

| CN | 102778887 | 11/2012 |
| DE | 202012002493 | 6/2012 |
| WO | 9705016 | 2/1997 |

OTHER PUBLICATIONS

European Search Report for European Application No. EP 16400002, Completed by the European Patent Office, dated Jul. 4, 2016, 6 Pages.
(Continued)

*Primary Examiner* — Magdalena Topolski
*Assistant Examiner* — Marisa V Conlon
(74) *Attorney, Agent, or Firm* — Brooks Kushman P.C.

(57) ABSTRACT

A rotary wing aircraft comprising a fuselage tail boom, a tail cone and an interface frame, the interface frame in turn having a connecting structure directly attached to the tail cone by means of a tail cone mechanical connection and a connecting sleeve fitting axially the fuselage tail boom, the connecting sleeve and the fuselage tail boom being directly attached by means of a one boom mechanical connection; the interface frame thereby joining the fuselage tail boom and the tail cone.

16 Claims, 2 Drawing Sheets

(51) Int. Cl.
*B64C 27/04* (2006.01)
*B64C 1/00* (2006.01)

(56) References Cited

U.S. PATENT DOCUMENTS

| | | | | |
|---|---|---|---|---|
| 7,841,818 | B2* | 11/2010 | Attanasio | F16B 5/0208 |
| | | | | 411/353 |
| 8,919,135 | B2* | 12/2014 | Barnes | F02C 7/20 |
| | | | | 60/226.2 |
| 8,985,512 | B1* | 3/2015 | Chan | B64C 1/061 |
| | | | | 244/120 |
| 9,327,811 | B2* | 5/2016 | Sancoff | B63B 1/14 |
| 9,481,443 | B2* | 11/2016 | Gonzalez Gozalbo | B64C 5/16 |
| 2004/0031879 | A1 | 2/2004 | Kay et al. | |
| 2006/0169835 | A1* | 8/2006 | Maille | B29C 70/342 |
| | | | | 244/17.19 |
| 2008/0099611 | A1* | 5/2008 | Martino Gonzalez | B64D 29/08 |
| | | | | 244/119 |
| 2008/0164376 | A1* | 7/2008 | Kato | B64C 3/28 |
| | | | | 244/132 |
| 2009/0074537 | A1 | 3/2009 | Attanasio | |
| 2009/0314426 | A1* | 12/2009 | Steinke | B64C 1/06 |
| | | | | 156/285 |
| 2011/0179626 | A1* | 7/2011 | Weber | B21J 15/14 |
| | | | | 29/428 |
| 2012/0011826 | A1 | 1/2012 | Barnes et al. | |
| 2012/0186062 | A1* | 7/2012 | Vera Villares | B64C 1/069 |
| | | | | 29/428 |
| 2012/0298792 | A1* | 11/2012 | Cardell | B64C 1/063 |
| | | | | 244/17.21 |
| 2017/0066518 | A1* | 3/2017 | Gallant | B64C 1/068 |

OTHER PUBLICATIONS

Chinese Third Office Action dated Sep. 11, 2019, Application No. 201710059564.6, Applicant Airbus Helicopters Deutschland GMBH, 8 Pages.

\* cited by examiner

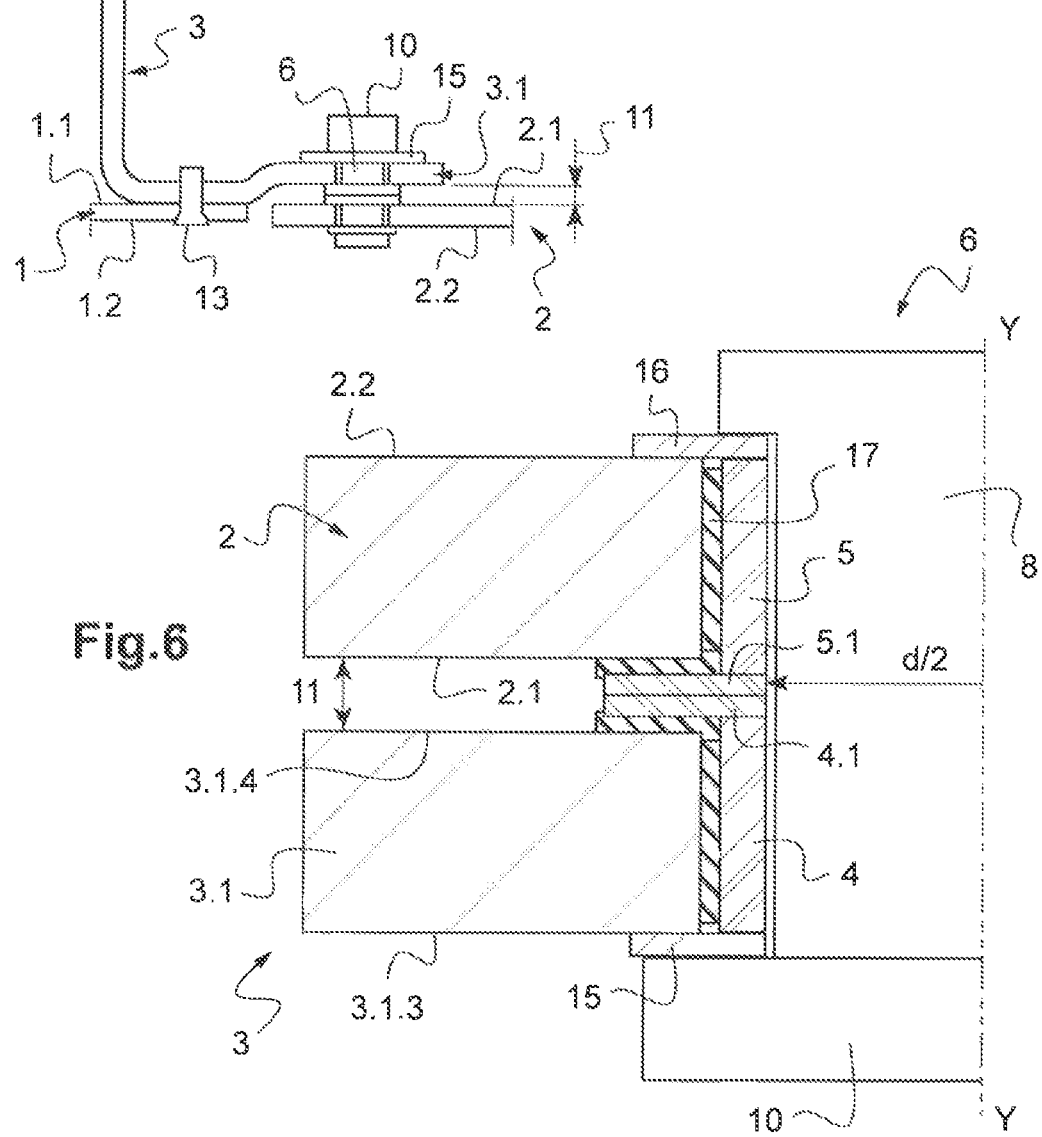

ROTARY WING AIRCRAFT WITH AN INTERFACE FRAME JOINING THE FUSELAGE TAIL BOOM AND THE TAIL CONE

CROSS REFERENCE TO RELATED APPLICATIONS

This application claims priority to European patent application No. EP16400002.8 filed on Jan. 29, 2016, the disclosure of which is incorporated in its entirety by reference herein.

BACKGROUND OF THE INVENTION

(1) Field of the Invention

The invention belongs to the field of rotary wing aircrafts, more particularly to the attachment, by means of interface frames, between the fuselage tail boom and the tail cone located at the rear of the rotary wing aircraft.

(2) Description of Related Art

Many rotary wing aircrafts of the prior art comprise a first interface frame attached to the tail cone and a second interface frame attached to the fuselage tail boom. The interface frames are normally made of a metal such as aluminum and they have a tubular body extending around the tail cone or the fuselage tail boom and a bended connecting flange substantially perpendicular to the tubular body. The interface frame is therefore L-shaped according to a longitudinal section of the rear of the rotary wing aircraft.

The tubular body of the first interface frame is attached to the tail cone and the tubular body of the second interface frame is attached to the fuselage tail boom, for example by means of rivets. In turn, the bended connecting flanges of the first and second interface frames are attached to one another with stretch bolts or a similar mechanical attachment. This way, the tail cone and the fuselage tail boom are joined, as is shown for instance in documents U.S. Pat. No. 5,676,335 and CN102778887.

This arrangement does often carry with it some disadvantages. The contact between parts made of different materials may lead to problems of corrosion. Besides, the presence of flanges in the interface frame may load the stretch bolts with tension forces, and the fact that the flanges are frequently located at the interior of the rear of the rotary wing aircraft makes inspection and maintenance works difficult. The arrangement may also be prone to fatigue issues.

The document WO9705016 describes a thruster for a helicopter, to counteract drive torque transmitted from a main rotor and to control yaw by controlling circulation of airflow around a tail boom. From a rear of the helicopter body, a round cylindrical tail boom extends outwardly. A rear portion of the tail boom accommodates the thruster mechanism. Along one side of the tail boom is provided a circulation control slot. Wall portions of the tail boom rigidly and co-axially mount a rear annular flange at rear ends thereof. The rear flange has inwardly directed spokes, mounting a bearing journal on the center line of the tail boom. To pass the spokes, the flanges have part circumferential slots allowing pivoting of the shutters.

The document DE202012002493 describes a helicopter tail with a tubular tail boom and a fixed rear end made of fiber composite materials, forming a tail rotor shrouded fin. The helicopter tail boom has a beam integrated into an integral arm and a nose section receives an integral web. The nose portion is in a fibrous material that forms a coherent unit with a final ridge of the tail fin section. At connection regions in the nose section is provided to receive the tubular tail boom. A spar is manufactured separately and assembled in a subsequent joining process on both sides with the connection regions by riveting, bolting or gluing.

The document US2004031879 describes a tail cone assembly for a helicopter. To join the tail cone assembly to the fuselage of the helicopter, a tail cone attachment fitting is joined to the shell using suitable means. The tail cone attachment fitting is formed from a lightweight metallic material or a composite material having a non-metallic matrix, that could be the same or different from the composite material forming the shell.

The document U.S. Pat. No. 4,244,661 describes a stacked graphite/epoxy structural joint having the fastener system. A split sleeve that has a cylindrical body portion, a radial flange at one end and a longitudinal split, is placed within a hole. The outer diameter of the sleeve and the width of the split are chosen so that when the sleeve is inserted in the hole, the split is closed. A washer is placed between the flange and the member to prevent damage to the structure adjacent the hole. A torqued fastener,—bolt and nut—is used in conjunction a washer. Where subjected to vibratory stresses and fretting between adjacent surfaces, Teflon coatings or Teflon coated stainless steel shims are applied therebetween prior to clamp up, drilling and reaming. The structural member adjacent the flange includes a relief which is formed by spot facing or in some instances single side pad coining.

BRIEF SUMMARY OF THE INVENTION

The present invention aims at providing a rotary wing aircraft that overcomes or minimizes at least several of these disadvantages. To achieve this, the rotary wing aircraft comprises:
a fuselage tail boom extending longitudinally along a longitudinal axis X, the fuselage tail boom having a tail boom inner surface, which delimits the interior of the fuselage tail boom, and a tail boom outer surface opposite the tail boom inner surface,
a tail cone extending longitudinally along the longitudinal axis X,
   an interface frame in turn having:
   a connecting sleeve extending longitudinally along the longitudinal axis X; the connecting sleeve comprising a connecting sleeve inner surface, which delimits the interior of the connecting sleeve, and a connecting sleeve outer surface opposite the connecting sleeve inner surface; the connecting sleeve outer surface overlapping the tail boom inner surface so that the connecting sleeve and the fuselage tail boom fit axially; the connecting sleeve and the fuselage tail boom being directly attached by means of at least one boom mechanical connection, and
   a connecting structure directly attached to the tail cone by means of at least one tail cone mechanical connection,
   the interface frame thereby joining the fuselage tail boom and the tail cone.

The connecting sleeve of the present invention's interface frame is a tubular body that extends along the longitudinal axis X substantially parallel to a region of the tail boom to which it is attached. More specifically, the connecting sleeve outer surface overlaps the tail boom inner surface, that is, the connecting sleeve outer surface partially extends over and covers the tail boom inner surface, the surfaces facing each other but not being necessarily in direct contact. At least one boom mechanical connection is provided between the connecting sleeve and the fuselage tail boom.

The interface frame further comprises a connecting structure which is directly attached to the tail cone by means of at least one tail cone mechanical connection.

Since the interface frame is directly attached to both the fuselage tail boom and the tail cone, a single interface frame is sufficient to join the fuselage tail boom and the tail cone. Besides, these direct attachments are also advantageous in that bended connecting flanges of the interface frame, substantially perpendicular to the surfaces of the fuselage tail boom and the tail cone, are avoided—the mechanical connections along these bended connecting flanges undergo undesired tensional stress, whereas the interface frame of the claimed invention is mostly subjected to shear stress, in which no pretension procedures are required. This simplifies the assembly and the maintenance of the structure.

Likewise, the lack of bended connecting flanges—together with the corresponding shear loading of the mechanical connections—is beneficial for mitigating the fatigue suffered by the parts. Besides, the fact the just one interface frame without bended connecting flanges is required entails a significant reduction in the weight of the structure.

The connecting structure may comprise a tubular region extending longitudinally along the longitudinal axis X, the tubular region having a tubular region inner surface, which delimits the interior of the tubular region, and a tubular region outer surface opposite the tubular region inner surface; wherein the tail cone comprises a tail cone inner surface, which delimits the interior of the tail cone, and a tail cone outer surface opposite the tail cone inner surface; and wherein the tubular region outer surface overlaps the tail cone inner surface, the tubular region being directly attached to the tail cone by means of the at least one tail cone mechanical connection.

The tubular region of this embodiment is a tubular body that extends along the longitudinal axis X substantially parallel to a region of the tail cone to which it is attached. More specifically, the tubular region outer surface overlaps the tail cone inner surface, that is, the tubular region outer surface partially extends over and covers the tail cone inner surface, the surfaces facing each other but not being necessarily in direct contact. The at least one tail cone mechanical connection joins, in this embodiment, the tubular region and the tail cone.

The connection between the tail cone and the interface frame by means of the tubular region of this embodiment contributes to limiting the forces on the connections to shear loads, due the parallelism of the tail cone and the surface of the interface frame to which it is attached.

In an example of this embodiment, the at least one tail cone mechanical connection is a rivet.

The fuselage tail boom, the tail cone and the interface frame may be made of a same composite material, such as carbon fiber reinforced plastic.

The fact that these parts of the rotary wing aircraft are of the same composite material dramatically improves the corrosion behavior, unlike some prior art disclosures wherein a metal interface frame joins a tail cone and a fuselage tail boom made of composite material. Besides, this embodiment enhances the weight reduction of the rotary wing aircraft. The fatigue reduction achieved by disposing of the bended connecting flanges allows the substitution of the composite material for the metal.

The at least one boom mechanical connection may comprise:
    an anchor nut attached to the connecting sleeve inner surface, and
    a bolt piercing i.e. going through the connecting sleeve and the fuselage tail boom and locked by the anchor nut, thereby attaching the fuselage tail boom and the connecting sleeve.

The anchor nut may be preinstalled on the connecting sleeve inner surface before the axial fitting of the fuselage tail boom and the interface frame. The anchor nut will therefore be located at the interior of the connecting sleeve and, after the axial fitting, at the interior of the fuselage tail boom. The bolt can then be secured to the anchor nut from the outside of the tail boom, which simplifies and shortens the assembly process.

The anchor nut may be attached to the connecting sleeve inner surface by means of an anchor nut ring.

The at least one boom mechanical connection may further comprise:
    a boom bushing lining a boom through-hole drilled in the fuselage tail boom,
    a frame bushing lining a frame through-hole drilled in the connecting sleeve,
    the frame bushing having a same inner bushing diameter and a same bushing axis as the boom bushing, thereby forming a bolt passageway thorough which the bolt pierces the connecting sleeve and the fuselage tail boom.

The frame bushing and the boom bushing do respectively line and delimit the frame though-hole and the boom though-hole, giving rise to a passageway with the appropriate inner diameter which helps introduce the bolt through the fuselage tail boom and through the connecting sleeve for its locking in the anchor nut.

The frame bushing and the boom bushing may respectively be bonded to the connecting sleeve and to the fuselage tail boom by means of an adhesive.

The frame bushing may be provided with a frame flange extending over the connecting sleeve outer surface. Similarly, the boom bushing may be provided with a boom flange extending over the tail boom inner surface. Either of them or the combination of the two allow for a separation between the tail boom inner surface and the connecting sleeve outer surface, referred to as circumferential gap.

The circumferential gap easies the axial fitting of the fuselage tail boom and the connecting sleeve—the space between both parts permits their correct positioning relative to each other. A preferred value of the circumferential gap is 0.5 mm.

The frame flange and the boom flange may respectively be bonded to the connecting sleeve outer surface and to the tail boom inner surface by means of an adhesive.

Alternatively to the solution with the frame flange and/or with the boom flange, the connecting sleeve may comprise two mouse holes symmetric to one another with respect to a longitudinal symmetry plane of the connecting sleeve, each one of the two mouse holes giving rise to a joggle in the connecting sleeve perimeter such that the connecting sleeve inner surface overlaps the tail boom outer surface along a first region of the connecting sleeve perimeter delimited by the two mouse holes, and the connecting sleeve outer surface overlaps the tail boom inner surface along a second region of the connecting sleeve perimeter delimited by the two mouse holes and complementary to the first region of the perimeter.

Each joggle implies a step along the connecting sleeve perimeter, that is, a sudden change in the distance from the connecting sleeve perimeter to the longitudinal axis X. Since the joggles occur at the points of the perimeter where the mouse holes are located, the combination of both features enables the alternating overlapping of surfaces described in the precedent paragraph, which leads to a simple axial fitting of the interface frame and the fuselage tail boom.

In order to make this fitting even easier, a recess may provide on the tail boom outer surface, the connecting sleeve fitting in this recess along the first region of the connecting sleeve perimeter.

A further inventive aspect lies in a method for assembling the fuselage tail boom and the tail cone of a rotary wing aircraft according to the above paragraphs, the method comprising the steps of:
  (i) providing an interface frame, the interface frame comprising a connecting structure and a connecting sleeve extending longitudinally along the longitudinal axis X; the connecting sleeve comprising a connecting sleeve inner surface, which delimits the interior of the interface frame, and a connecting sleeve outer surface opposite the connecting sleeve inner surface;
  (ii) providing the interface frame with at least one boom mechanical connection;
  (iii) directly attaching the connecting structure to the tail cone by means of at least one tail cone mechanical connection;
  (iv) overlapping the connecting sleeve outer surface with the tail boom inner surface, thus axially fitting the connecting sleeve and the fuselage tail boom;
  (v) securing the at least one boom mechanical connection so that the fuselage tail boom and the connecting sleeve are directly attached.

The advantages of the rotary wing aircraft detailed above are extensive to this method. In addition to them, the fact that the method only requires a single frame to attach the fuselage tail boom and the tail cone contributes to reducing the time and cost of the overall process of assembly.

The particular examples of rotary wing aircrafts detailed above are equally valid for the present methods. In particular, the at least one boom mechanical connection of the present method may comprise:
  an anchor nut attached to the connecting sleeve inner surface, and
  a bolt piercing the connecting sleeve and the fuselage tail boom and locked by the anchor nut, thereby attaching the fuselage tail boom and the connecting sleeve.

The provision of anchor nuts attached to the connecting sleeve inner surface in step (ii) does also add to the optimization of the process—step (v) can be carried out without accessing the interior of the fuselage tail boom and of the interface frame, that is, the at least one boom mechanical connection can be secured from the outside of the rotary wing aircraft.

The at least one boom mechanical connection may further comprise:
  a boom bushing lining a boom through-hole drilled in the fuselage tail boom,
  a frame bushing lining a frame through-hole drilled in the interface frame,
  the frame bushing having a same inner bushing diameter and a same bushing axis as the boom bushing, thereby forming a bolt passageway thorough which the bolt pierces the connecting sleeve and the fuselage tail boom,
  wherein the frame bushing is provided with a frame flange extending over the connecting sleeve outer surface and/or wherein the boom bushing is provided with a boom flange extending over the tail boom inner surface, in such a manner that a circumferential gap is defined in between the tail boom inner surface and the connecting sleeve outer surface,
  the circumferential gap allowing for the axial fitting of step (iv).

The connecting sleeve used in the present method may comprise, in an alternative to the provision of a boom bushing and/or a frame bushing, two mouse holes symmetric to one another with respect to a longitudinal symmetry plane of the connecting sleeve, each one of the two mouse holes giving rise a joggle in the connecting sleeve perimeter such that, in step (iv), the connecting sleeve inner surface overlaps the tail boom outer surface along a first region of the connecting sleeve perimeter delimited by the two mouse holes, and the connecting sleeve outer surface overlaps the tail boom inner surface along a second region of the connecting sleeve perimeter delimited by the two mouse holes and complementary to the first region of the connecting sleeve perimeter.

As explained above, the joggles of the connecting sleeve perimeter allows an arrangement according to which the axial fitting of the interface frame and the fuselage boom is facilitated by the fact that the connecting sleeve inner surface faces the tail boom outer surface along the first region of the connecting sleeve perimeter and the connecting sleeve outer surface faces the tail boom inner surface along the second region of the connecting sleeve perimeter.

BRIEF DESCRIPTION OF THE DRAWINGS

These and other features and advantages of the invention will become more evident in the light of the following detailed description of preferred embodiments, given only by way of illustrative and non-limiting example, in reference to the attached figures:

FIG. 4 shows in detail the joggle in the connecting sleeve perimeter, defined by a mouse hole.

FIG. 5 depicts a longitudinal section of the rear of the rotary wing aircraft, wherein the connecting sleeve of the interface frame is directly attached to the fuselage tail boom and the tubular region of the connecting sleeve is directly attached to the tail cone.

FIG. 6 illustrates in detail the boom mechanical connection used in the embodiment of FIG. 5.

DETAILED DESCRIPTION OF THE INVENTION

Figure 1:
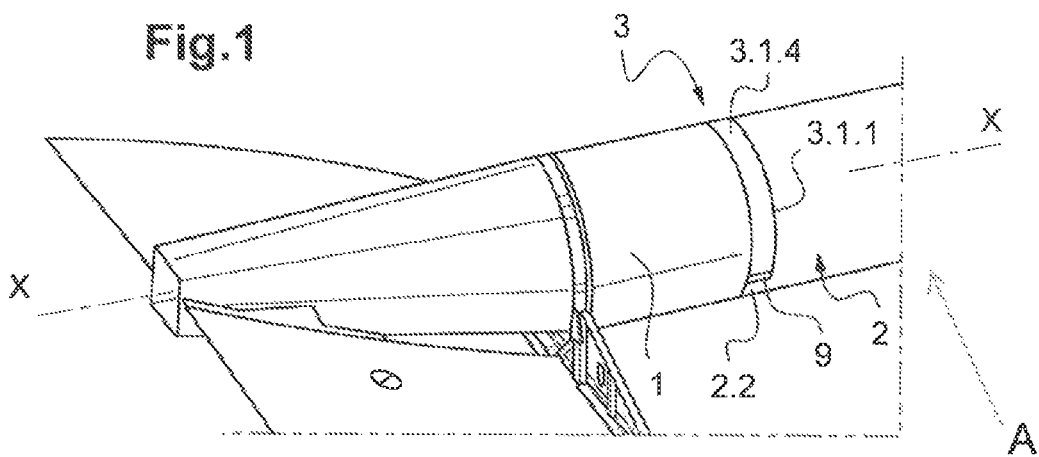
FIG. 1 shows a perspective view of the rear of a rotary wing aircraft in which the tail cone and the fuselage tail boom are joined by an interface frame.

FIG. 1 shows the rear of a rotary wing aircraft A in which the fuselage tail boom 2 is joined to the tail cone 1 by means of an interface frame 3 directly attached to both the fuselage tail boom 2 and the tail cone 1. The tail cone 1, the connecting sleeve 3.1 of the interface frame 3 and the fuselage tail boom 2 extend longitudinally along the longitudinal axis X. In the embodiment of FIG. 1, part of the interface frame 3 is visible from the exterior of the rotary wing aircraft A—the provision of two mouse holes 9, one of which is hidden in the figure, enables a change of the surfaces of the fuselage tail boom 2 and the connecting sleeve 3.1 that overlap, that is, that face one another.

Along the first region 3.1.1 of the connecting sleeve perimeter, delimited by the mouse holes 9, the connecting sleeve inner surface 3.1.3 overlaps the tail boom outer surface 2.2. The connecting sleeve outer surface 3.1.4 is therefore visible from the outside of the rotary wing aircraft.

Along the second region 3.1.2 of the connecting sleeve perimeter, complementary to the first region 3.1.1, the connecting sleeve outer surface 3.1.4 overlaps the tail boom inner surface 2.1. Hence, the tail boom outer surface 2.2 is visible from the outside of the rotary wing aircraft A, as depicted at the bottom part of the rotary wing aircraft A of the figure.

The connecting structure 3.2, directly attached to the tail cone 1, is hidden in FIG. 1 by the tail cone 1 itself.

Figure 2:
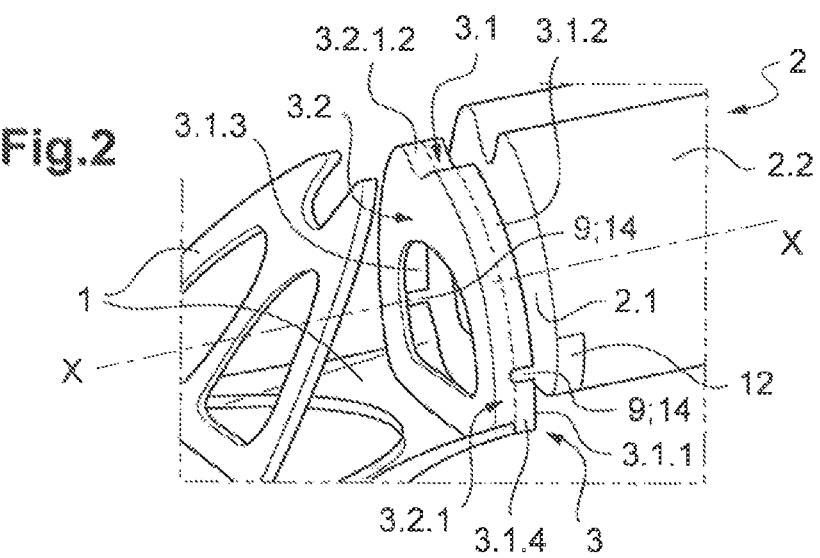
FIG. 2 represents a perspective view of the tail cone attached to an interface frame comprising mouse holes and of the fuselage tail boom before being axially fitted in the connecting sleeve of the interface frame.

The embodiment comprising two mouse holes 9 is depicted in greater detail in FIG. 2, wherein the fuselage tail boom 2 is not attached to the connecting sleeve 3.1 yet.

For the sake of illustration, the tail cone 1 is only partially shown. In consequence, the connecting structure 3.2, despite being covered by—and attached to—the tail cone 1, can be seen in FIG. 2, separated from the connecting sleeve 3.1 by a dotted line. The features of the connecting structure 3.2 represented in in FIG. 5 are of course applicable to the present embodiment—as an example, the tubular region outer surface 3.2.1.2 of FIG. 5 is also shown in FIG. 2.

The mouse holes 9 define two complementary regions along the connecting sleeve perimeter—the first region 3.1.1, located below the mouse holes 9 according to the reference of FIG. 2, and the second region 3.1.2, located above the mouse holes 9.

Figure 3:
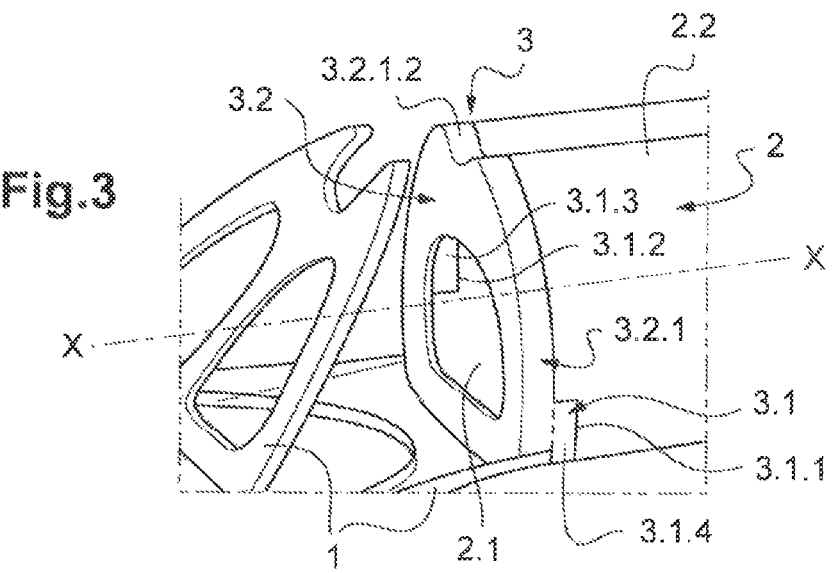
FIG. 3 illustrates the embodiment of FIG. 2 after the axial fitting of the fuselage tail boom and the connecting sleeve.

A recess 12 is defined in the area of the tail boom outer surface 2.2 that receives the connecting sleeve inner surface 3.1.3, as is illustrated in FIG. 3.

In this figure, the fuselage tail boom 2 and the connecting sleeve fit axially—they are secured by means of a boom mechanical connection 6, not shown in the figure. Boom mechanical connections 6 as those shown in FIGS. 5 and 6, but without the frame flange 4.1 and the boom flange 5.1, are examples applicable to the present embodiment.

The references of FIG. 3 correspond to those of FIGS. 1 and 2. In particular, along the second region 3.1.2 of the connecting sleeve perimeter, the connecting sleeve inner surface 3.1.3 can be seen at the interior of the interface frame 3. The connecting sleeve outer surface 3.1.4 corresponding to this second region 3.1.2 is hidden by the fuselage tail boom 2 and overlaps the tail boom inner surface 2.1, as can be better appreciated in FIG. 2.

In turn, along the first region 3.1.1 of the connecting sleeve perimeter, the connecting sleeve outer surface 3.1.4 can be seen from the exterior of the rotary wing aircraft A. The connecting sleeve inner surface 3.1.3 overlaps the tail boom outer surface 2.2, in particular the recess 12, as can be better appreciated in FIG. 2.

FIG. 4 shows in greater detail the mouse holes 9 of the embodiment of FIGS. 1, 2 and 3. It can be seen that a joggle 14 is provided between the first region 3.1.1 and the second region 3.1.2 of the connecting sleeve perimeter to allow for the above explained change of overlapping surfaces.

In the embodiment of FIG. 5, a longitudinal section of the interface frame 3 and of part of the tail cone 1 and of the fuselage tail boom 2 is shown. The interface frame 3 comprises a connecting sleeve 3.1 and a connecting structure 3.2, which in turn comprises a tubular region 3.2.1. The tubular region 3.2.1 and the connecting sleeve 3.1 extend longitudinally along the longitudinal axis X.

The tubular region 3.2.1 comprises a tubular region inner surface 3.2.1.1, which delimits the interior of the tubular region 3.2.1, and a tubular region outer surface 3.2.1.2 opposite the tubular region inner surface 3.2.1.1. Likewise, the tail cone 1 comprises a tail cone inner surface 1.1, which delimits the interior of the tail cone 1, and a tail cone outer surface 1.2 opposite the tail cone inner surface 1.1. The tail cone inner surface 1.1 overlaps the tubular region outer surface 3.2.1.2, that is, both surfaces partially face, extend over and cover one another. The tubular region 3.2.1, and therefore the interface frame 3, is directly attached to the tail cone 1 by means of a rivet 13.

As has been described for the previous embodiments, the connecting sleeve 3.1 defines a connecting sleeve inner surface 3.1.3, which delimits the interior of the connecting sleeve 3.1, and a connecting sleeve outer surface 3.1.4 opposite the connecting sleeve inner surface 3.1.3. In this embodiment, the overlapping between the connecting sleeve 3.1 and the fuselage tail boom 2 takes place exclusively between the connecting sleeve outer surface 3.1.4 and the tail boom inner surface 2.1. Thus, no substantial part of the connecting sleeve inner surface 3.1.3 can be seen from the exterior of the rotary wing aircraft in the present embodiment.

The boom mechanical connection 6 of this embodiment is thoroughly depicted in FIG. 6. An anchor nut 10 is attached to the connecting sleeve inner surface 3.1.3. This can be done before the axial fitting of the connecting sleeve 3.1 and the fuselage tail boom 2, thus allowing for easily securing the fuselage tail boom 2 and the connecting sleeve 3.1 with a bolt 8 without accessing the interior of the fuselage tail boom 3, that is, from the outside of the rotary wing aircraft A. An anchor nut ring 15 is provided in between the anchor nut 10 and the connecting sleeve inner surface 3.1.3.

The bolt 8 pierces (i.e. runs across/goes through) the connecting sleeve 3.1 and the fuselage tail boom 2 and is locked by the anchor nut 10, thereby attaching the fuselage tail boom 2 and the connecting sleeve 3.1.

The boom mechanical connection 6 of this embodiment additionally comprises a boom bushing 5 lining a boom through-hole drilled in the fuselage tail boom 2 and a frame bushing 4 lining a frame through-hole drilled in the interface frame 3. The frame bushing 4 has a same inner bushing diameter d and a same bushing axis Y as the boom bushing 5, thereby forming a bolt passageway thorough which the bolt 8 pierces the connecting sleeve 3.1 and the fuselage tail boom 2.

Likewise, the frame bushing 4 is provided with a frame flange 4.1 extending over the connecting sleeve outer surface 3.1.4, and the tail boom bushing 5 is provided with a boom flange 5.1 extending over the tail boom inner surface 2.1. The frame flange 4.1 and the boom flange 5.1 play the role of a stop for one another, as a result of which the connecting sleeve outer surface 3.1.4 is separated from the tail boom inner surface 2.1 by a circumferential gap 11, as depicted in FIGS. 5 and 6. The same effect could be achieved with just one of the frame flange 4.1 and the boom flange 5.1, in which case the frame flange 4.1 would act as a stop of the tail boom inner surface 2.1 or the boom flange 5.1 would act as a stop for the connecting sleeve outer surface 3.1.4.

A washer 16 is positioned between the head of the bolt 8 and the tail boom outer surface 2.2 to prevent them from directly contacting one another.

The boom bushing 5, including the boom flange 5.1, and the frame bushing 4, including the frame flange 4.1, are respectively bonded to the fuselage tail boom 2 and to the connecting sleeve 3.1 by means of an adhesive 17.

REFERENCES

A. - Rotary wing aircraft
1. - Tail cone
1.1. - Tail cone inner surface
1.2. - Tail cone outer surface
2. - Fuselage tail boom
2.1 - Fuselage tail boom inner surface
2.2. - Fuselage tail boom outer surface
3. - Interface frame
3.1. - Connecting sleeve
3.1.1. - First region
3.1.2 - Second region
3.1.3. - Connecting sleeve inner surface
3.1.4. - Connecting sleeve outer surface
3.2. - Connecting structure
3.2.1. - Tubular region
3.2.1.1. - Tubular region inner surface
3.2.1.2. - Tubular region outer surface
4. - Frame bushing
4.1. - Frame flange
5. - Boom bushing
5.1. - Boom flange
6. - Boom mechanical connexion
8. - Bolt
10. - Anchor nut
11. - Circumferential gap
12. - Recess
13. - Rivet
14. - Joggle
15. - Anchor nut ring
16. - Washer
17. - Adhesive
X. - Longitudinal axis
Y. - Bushing axis
d. - Bushing diameter

What is claimed is:

1. A rotary wing aircraft comprising:
a fuselage tail boom extending longitudinally along a longitudinal axis, the fuselage tail boom having a tail boom inner surface, which delimits the interior of the fuselage tail boom, and a tail boom outer surface opposite the tail boom inner surface,
a tail cone extending longitudinally along the longitudinal axis,
an interface frame in turn having:
a connecting sleeve extending longitudinally along the longitudinal axis; the connecting sleeve comprising a connecting sleeve inner surface, which delimits the interior of the connecting sleeve, and a connecting sleeve outer surface opposite the connecting sleeve inner surface; the connecting sleeve outer surface overlapping the tail boom inner surface so that the connecting sleeve and the fuselage tail boom fit axially; the connecting sleeve and the fuselage tail boom being directly attached by means of at least one boom mechanical connection, and
a connecting structure directly attached to the tail cone by means of at least one tail cone mechanical connection;
the interface frame, the fuselage tail boom and the tail cone are all made of the same composite material, the interface frame joining the fuselage tail boom and the tail cone; the at least one boom mechanical connection being shear loaded and comprising a boom bushing lining a boom through-hole drilled in the fuselage tail boom and a frame bushing lining a frame through-hole drilled in the interface frame; the frame bushing being provided with a frame flange extending over the connecting sleeve outer surface, and the boom bushing being provided with a boom flange extending over the tail boom inner surface such that the frame flange and the boom flange form a stop for one another resulting in separating the connecting sleeve outer surface from the tail boom inner surface by a circumferential gap.

2. The rotary wing aircraft of claim 1, wherein the composite material is carbon fiber reinforced plastic.

3. The rotary wing aircraft of claim 1, wherein the connecting structure comprises a tubular region extending longitudinally along the longitudinal axis, the tubular region having a tubular region inner surface, which delimits the interior of the tubular region, and a tubular region outer surface opposite the tubular region inner surface; wherein the tail cone comprises a tail cone inner surface, which delimits the interior of the tail cone, and a tail cone outer surface opposite the tail cone inner surface; and wherein the tubular region outer surface overlaps the tail cone inner surface, the tubular region being directly attached to the tail cone by means of the at least one tail cone mechanical connection.

4. The rotary wing aircraft of claim 3, wherein the at least one tail cone mechanical connection is a rivet.

5. The rotary wing aircraft of claim 1, wherein the at least one boom mechanical connection comprises:
an anchor nut attached to the connecting sleeve inner surface, and
a bolt piercing the connecting sleeve and the fuselage tail boom and locked by the anchor nut, thereby attaching the fuselage tail boom and the connecting sleeve.

6. The rotary wing aircraft of claim 5, wherein the anchor nut is attached to the connecting sleeve inner surface by means of an anchor nut ring.

7. The rotary wing aircraft of claim 5,
the frame bushing lining a frame through-hole is drilled in the connecting sleeve,
the frame bushing having a same inner bushing diameter and a same bushing axis as the boom bushing, thereby forming a bolt passageway thorough which the bolt pierces the connecting sleeve and the fuselage tail boom.

8. A method for assembling a fuselage tail boom and a tail cone of a rotary wing aircraft according to claim 1, the method comprising the steps of:
(i) providing an interface frame, the interface frame comprising a connecting structure and a connecting sleeve extending longitudinally along the longitudinal axis; the connecting sleeve comprising a connecting sleeve inner surface, which delimits the interior of the connecting sleeve, and a connecting sleeve outer surface opposite the connecting sleeve inner surface;
(ii) providing the connecting sleeve with at least one boom mechanical connection;
(iii) directly attaching the connecting structure to the tail cone by means of at least one tail cone mechanical connection;
(iv) overlapping the connecting sleeve outer surface with the tail boom inner surface, thus axially fitting the connecting sleeve and the fuselage tail boom; and (v) securing the at least one boom mechanical connection so that the fuselage tail boom and the connecting sleeve are directly attached with the circumferential gap.

9. The method of claim 8, wherein the at least one boom mechanical connection comprises:
   an anchor nut attached to the connecting sleeve inner surface, and
   a bolt piercing the connecting sleeve and the fuselage tail boom and locked by the anchor nut, thereby attaching the fuselage tail boom and the connecting sleeve.

10. The method of claim 9, wherein the at least one boom mechanical connection further comprises:
    a boom bushing lining a boom through-hole drilled in the fuselage tail boom,
    a frame bushing lining a frame through-hole drilled in the interface frame, and
    the frame bushing having a same inner bushing diameter and a same bushing axis as the boom bushing, thereby forming a bolt passageway thorough which the bolt pierces the connecting sleeve and the fuselage tail boom,
    wherein the frame bushing is provided with a frame flange extending over the connecting sleeve outer surface and/or wherein the boom bushing is provided with a boom flange extending over the tail boom inner surface, in such a manner that the circumferential gap is defined in between the tail boom inner surface and the connecting sleeve outer surface,
    the circumferential gap allowing for the axial fitting of step (iv).

11. The method of claim 8, wherein the connecting sleeve comprises two mouse holes symmetric to one another with respect to a longitudinal symmetry plane of the connecting sleeve, each one of the two mouse holes giving rise to a joggle in the connecting sleeve perimeter such that, in step (iv), the connecting sleeve inner surface overlaps the tail boom outer surface along a first region of the connecting sleeve perimeter delimited by the two mouse holes, and the connecting sleeve outer surface overlaps the tail boom inner surface along a second region of the connecting sleeve perimeter delimited by the two mouse holes and complementary to the first region of the perimeter.

12. A rotary wing aircraft comprising:
    a fuselage tail boom extending longitudinally along a longitudinal axis, the fuselage tail boom having a tail boom inner surface, which delimits the interior of the fuselage tail boom, and a tail boom outer surface opposite the tail boom inner surface,
    a tail cone extending longitudinally along the longitudinal axis,
    an interface frame having:
       a connecting sleeve extending longitudinally along the longitudinal axis; the connecting sleeve comprising a connecting sleeve inner surface, which delimits the interior of the connecting sleeve, and a connecting sleeve outer surface opposite the connecting sleeve inner surface; the connecting sleeve outer surface overlapping the tail boom inner surface so that the connecting sleeve and the fuselage tail boom fit axially; the connecting sleeve and the fuselage tail boom being directly attached by at least one boom mechanical connection, and
       a connecting structure directly attached to the tail cone by at least one tail cone mechanical connection,
    the interface frame joining the fuselage tail boom and the tail cone; the at least one boom mechanical connection being shear loaded and comprising a boom bushing lining a boom through-hole drilled in the fuselage tail boom and a frame bushing lining a frame through-hole drilled in the interface frame; the frame bushing being provided with a frame flange extending over the connecting sleeve outer surface, and the boom bushing being provided with a boom flange extending over the tail boom inner surface such that the frame flange and the boom flange form a stop for one another resulting in separating the connecting sleeve outer surface from the tail boom inner surface by a circumferential gap.

13. The rotary wing aircraft of claim 12, wherein the interface frame, the fuselage tail boom and the tail cone are all made of carbon fiber reinforced plastic.

14. The rotary wing aircraft of claim 12, wherein the connecting structure comprises a tubular region extending longitudinally along the longitudinal axis, the tubular region having a tubular region inner surface, which delimits the interior of the tubular region, and a tubular region outer surface opposite the tubular region inner surface; wherein the tail cone comprises a tail cone inner surface, which delimits the interior of the tail cone, and a tail cone outer surface opposite the tail cone inner surface; and wherein the tubular region outer surface overlaps the tail cone inner surface, the tubular region being directly attached to the tail cone by means of the at least one tail cone mechanical connection.

15. The rotary wing aircraft of claim 12, wherein the at least one boom mechanical connection comprises:
    an anchor nut attached to the connecting sleeve inner surface, and
    a bolt piercing the connecting sleeve and the fuselage tail boom and locked by the anchor nut, thereby attaching the fuselage tail boom and the connecting sleeve.

16. The rotary wing aircraft of claim 15, wherein
    the frame bushing lining a frame through-hole is drilled in the connecting sleeve,
    the frame bushing having a same inner bushing diameter and a same bushing axis as the boom bushing, thereby forming a bolt passageway thorough which the bolt pierces the connecting sleeve and the fuselage tail boom.

\* \* \* \* \*